(No Model.)

J. ULFERS.
BUTCHERING DERRICK.

No. 494,398. Patented Mar. 28, 1893.

Witnesses
Jesse Heller.
Phill Mase.

Inventor
Jacob Ulfers
by E. W. Anderson
his Attorney

UNITED STATES PATENT OFFICE.

JACOB ULFERS, OF MARYLAND, ILLINOIS.

BUTCHERING-DERRICK.

SPECIFICATION forming part of Letters Patent No. 494,398, dated March 28, 1893.

Application filed July 5, 1892. Serial No. 438,895. (No model.)

*To all whom it may concern:*

Be it known that I, JACOB ULFERS, a citizen of the United States, and a resident of Maryland, in the county of Ogle and State of Illinois, have invented certain new and useful Improvements in Butchering-Derricks; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
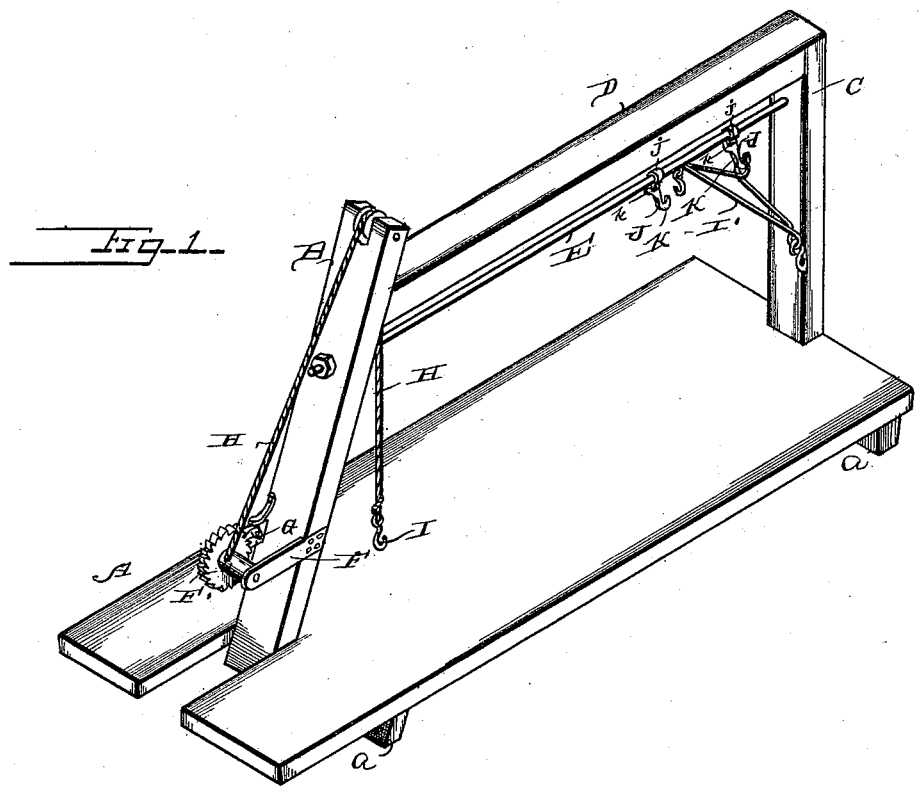
Figure 2:
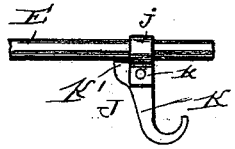

Figure 1 of the drawings is a perspective view of the invention and Fig. 2 is a detail view.

This invention has relation to certain new and useful improvements in butchers' derricks, the object being to provide a simple and convenient device for use by butchers and farmers in handling slaughtered hogs, or other animals; and the invention consists in the novel construction and combination of parts, all as hereinafter specified and claimed.

Referring to the accompanying drawings, the letter A designates a platform, constructed preferably of heavy plank, and supporting the two posts B and C, as shown, said posts also passing below the under surface of the platform, whereby they are secured to the transverse braces $a, a$.

D designates a longitudinal bar or brace connecting the upper portions of the posts B and C.

E is the supporting rod, which runs longitudinally underneath the bar D, its ends projecting through the posts and made fast, in any suitable manner as indicated.

On the post B, which is set obliquely is a bracket F, in which is journaled a ratchet and winding drum F', having a pawl G, and operated by a crank or other suitable means, (not shown.) Said winding drum carries a rope H which passes up and over a small pulley at the upper end of the post B, thence down through the bar D. Said rope has a hook I on its lower end for connection with the gambrel I'.

J, J, designate hooks, any number of which may be employed, and which are provided each with a sleeve portion $j$, which slides loosely on the rod E. Pivoted in depending lugs $k$ of this sleeve is a hook K, having its upper rear corner horizontally extended as indicated at K'. This extension is so arranged that when a piece of meat or the body of a slaughtered animal is hung on the hook, it will take a bearing against the rod E, and thus serve to hold the hook at any point it is placed on said rod.

After the hog or other animal supported by the gambrel I' has been raised, it is transferred to one of the hooks K, and pushed to the other end of the rod.

Having described this invention, what I claim, and desire to secure by Letters Patent, is—

The herein described butcher's derrick, comprising the platform, the posts supported therefrom, the horizontal brace connecting said posts, the rod underneath said brace and secured in said post, the hoisting windlass and gambrel, and the hooks arranged to slide on said rod and having extensions designed to bear against said rod when the hooks are weighted, substantially as specified.

In testimony whereof I affix my signature in presence of two witnesses.

JACOB ULFERS.

Witnesses:
CHARLES F. MARTZ,
EDWARD E. HALLER.